(12) United States Patent
Connan et al.

(10) Patent No.: US 9,483,570 B2
(45) Date of Patent: Nov. 1, 2016

(54) DRIVING A USER EXPERIENCE OF A WEB APPLICATION USING RULES THAT ESTABLISH OR CHANGE REQUESTS BASED ON USER BEHAVIOR

(75) Inventors: Matthieu Connan, Castleknock (IE); Shadi Ghaith, Castaheany (IE); Kiransingh Ghoorbin, Dublin (IE); David Manning, Dublin (IE); Mark McGloin, Killiney (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 590 days.

(21) Appl. No.: 12/981,679

(22) Filed: Dec. 30, 2010

(65) Prior Publication Data

US 2012/0173607 A1 Jul. 5, 2012

(51) Int. Cl.
| G06F 15/16 | (2006.01) |
| G06F 17/30 | (2006.01) |
| H04L 29/08 | (2006.01) |
| H04L 29/06 | (2006.01) |

(52) U.S. Cl.
CPC ..... *G06F 17/3089* (2013.01); *G06F 17/30899* (2013.01); *H04L 29/06047* (2013.01); *H04L 29/0809* (2013.01)

(58) Field of Classification Search
CPC .......................................................... G06F 15/16
USPC ................. 709/201–203, 217–219, 231, 232
See application file for complete search history.

(56) References Cited

U.S. PATENT DOCUMENTS

| 7,043,524 | B2 * | 5/2006 | Shah et al. ..................... 709/203 |
| 7,085,682 | B1 | 8/2006 | Heller et al. |
| 7,801,945 | B1 * | 9/2010 | Geddes et al. ................. 709/203 |
| 2005/0055426 | A1 * | 3/2005 | Smith et al. ................... 709/219 |
| 2006/0117028 | A1 | 6/2006 | Harrison et al. |
| 2007/0198634 | A1 * | 8/2007 | Knowles et al. ............. 709/203 |
| 2009/0138589 | A1 | 5/2009 | Wunderlich |
| 2010/0094884 | A1 * | 4/2010 | Baldwin et al. .............. 707/755 |
| 2010/0262457 | A1 | 10/2010 | House |
| 2011/0231478 | A1 * | 9/2011 | Wheeler et al. .............. 709/203 |
| 2011/0264731 | A1 * | 10/2011 | Knowles et al. ............. 709/203 |

* cited by examiner

*Primary Examiner* — Aftab N. Khan
(74) *Attorney, Agent, or Firm* — Patents on Demand P.A.; Brian K. Buchheit; Scott M. Garrett

(57) ABSTRACT

A set of hypertext transfer protocol (HTTP) requests for Web application content can be routed from a client computing device to a Web server. The routed HTTP requests can be analyzed for patterns indicative of user interest in a business offering available via the Web application. An unrequested HTTP request can be conveyed to the Web server for Web application content that was not explicitly requested from the client computing device. The Web server can convey a response to the unrequested HTTP request that provides content from the Web application related specifically to the user interest. The response can cause a user interface of a Web browser of the client computing device to display the content that is related to the user interest.

20 Claims, 3 Drawing Sheets

DRIVING A USER EXPERIENCE OF A WEB APPLICATION USING RULES THAT ESTABLISH OR CHANGE REQUESTS BASED ON USER BEHAVIOR

BACKGROUND

The present invention relates to the field of Web applications.

Web applications are generally constructed to suit the needs of an average or baseline user. This can be a challenge for Web sites that support multiple different options and multiple different types of users. For example, a Web site can be for a service-based business, such as a health care business, an insurance company, a law firm, and the like. Such a Web site is typically designed to provide information to existing users about their current account status, to permit existing users to make changes to their account information online, and to permit existing users to engage in additional services. At the same time, the Web site provides information to new users. For example, new users can be offered products and services in hopes of generating new business relationships with these potential customers. From the above, it is evident that many Web sites and/or Web applications are designed to cater to multiple different types of users having different user-specific needs.

To assess these needs and provide a suitable user experience, an iterative software development lifecycle is typically used to develop and refine the Web site and/or Web application. In this lifecycle, an initial software prototype is developed, which may undergo user experience testing. Feedback from the user experience testing can result in changes to the user interface. Ultimately, a versioned Web site is publicly released. After release, feedback can be received from users and/or other metrics can be gathered. The feedback and metrics can be considered by a development team, which can be used to improve the user experience in a next iterative public release of the Web site and/or Web application.

BRIEF SUMMARY

One aspect of the disclosure can include a method, computer program product, apparatus, and system. In this aspect, a set of one or more RESTful requests can be received from a client computing device. Each of the RESTful requests can include a resource identifier that uniquely identifies a Web resource provided by a Web server. At least one pattern can be determined from analyzing the set of RESTful requests. The pattern can be compared against a set of previously established patterns. Each of the previously established patterns can be indexed against a resource identifier of the Web server. Results from the comparing can include a match of at least one pattern to a corresponding previously established pattern. A RESTful request can be conveyed to the Web server for the Web resource identified by the matched resource identifier. The RESTful request can cause the Web server to serve the Web resource identified by the matched resource identifier to the client computing device.

In another aspect of the disclosure, a set of hypertext transfer protocol (HTTP) requests for Web application content can be routed from a client computing device to a Web server. The routed HTTP requests can be analyzed for patterns indicative of user interest in a business offering available via the Web application. An unrequested (by a user) HTTP request can be conveyed to the Web server. The HTTP request can be one that was not explicitly requested by a user of the client computing device. The Web server can convey a response to the HTTP request. The response can provide content from the Web application related specifically to the user interest. The response can cause a user interface of a Web browser of the client computing device to display the content that is related to the user interest. Thus, the user experience of the Web application is modified based on the detected pattern and based on the inferred user interest. In one embodiment, this modification to the user experience can occur without modifying code of the Web application.

DETAILED DESCRIPTION

Figure 1:
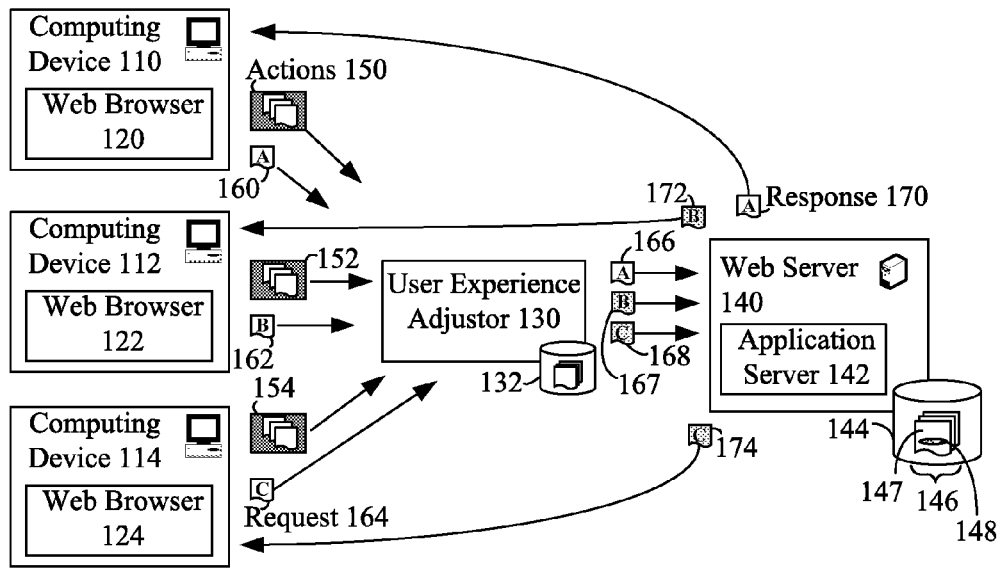
FIG. 1 is a system for adjusting a user's experience with a Web application using behavior driven rules in accordance with an embodiment of the disclosure.
Figure 1:
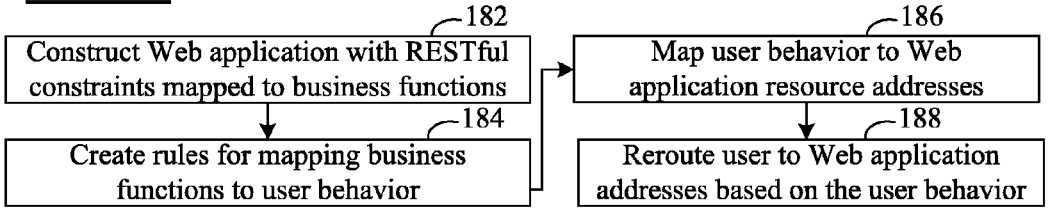

Problems exist with changing a user experience of a Web application through iterative software releases of a Web application. Fundamentally, most Web application development cycles require the hard-coded logic of the Web application to be changed on a version-by-version basis. A new release must be developed, coded, tested, approved, and released. After the time required for these actions, many missed opportunities can result in the interim. Further, Web applications are often required to be more adaptive than other types of software programs; else customers can be easily lured to more attractive Web applications offered by competitors. Accordingly, missed opportunities and an inability to nimbly adjust to current trends and market desires can mark a different between a highly successful Web application and one that is a failure.

Turning back to the software development lifecycle, it should be observed that in a conventional lifecycle process is iterative. Additionally, most Web applications use hard coded logic to detect user behavior (if the Web applications are adaptive to user behavior at all). Conventional Web applications often provide help menus to suggest how to use the application. Extensive use of help menus represents a paradigm where users are required to adapt to and learn the user interface of the Web application; instead of attempting to adapt the user interface to suit behavior of the user.

The software development cycle often uses usability testing to gather feedback for providing a better user experience. The feedback can be gathered from text users using a product under-test (e.g., a beta version of an upcoming release) or by data mining against server logs of a real-time system. Usability issues detected from this feedback can result in new hard coded logic or help menus being incorporated in future releases of the Web application. However, often the users participating in testing are not an accurate representation of the user population. Thus, a real user is often disconnected from the process of modifying the user experience.

The present disclosure provides a system able to adjust a user's experience without changing Web application code.

The disclosure captures a set of HTTP requests and discerns patterns from these requests. From these patterns, a user's intension or desires can be inferred. For example, when a user spends a significant time reading a Web page, it can be assumed that the user is interested in the content of that page. Similarly, when a user quickly navigates between pages having a commonality, it can be inferred that the user is interested in that commonality, but hasn't found information he/she is looking for (or is interested in). Typically, this inability of a user to find desired content can result in a lost opportunity (the user leaving the Web site). The disclosure is able to create a request for content (issue an HTTP request) that targets the user interest, which results in that information being presented to the user without the user explicitly having to request the content.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a system for adjusting a user's experience with a Web application using behavior driven rules in accordance with an embodiment of the disclosure. The user behavior can be determined from a set of actions 150, 152, 154, which can include Hypertext Transfer Protocol (HTTP) requests directed towards one or more Web servers 140; other RESTful requests can also be used. A user experience adjustor 130 can determine the user behavior by intercepting the actions 150-154. In one embodiment, patterns can be determined from the actions 150, 152, 154. A set of configurable rules established in a data store 132 can be driven by the patterns. These patterns can cause a user to be redirected to an address of a Web server 140 (e.g., a Uniform Resource Identifier (URI)), which a request issuing client device 110, 112, 114 did not explicitly request. In one embodiment, the redirected address can be associated with a business function. The business function can be an action or set of actions that are taken in response to the user's behavior (actions 150-154), which alter a user's experience with a Web application 146. Thus, a user's experience with a Web application 147 is dynamically adjusted for the user's behavior. These adjustments can be performed in accordance to a set of rules of data store 132. Consequently, the user specific adjustments are configurable by changing the rules of data store 132 and are not dependent on code logic of the Web application 146 itself.

To elaborate further, the actions 150, 152, 154 can be used by the user experience adjustor 130 to establish patterns (in data store) 132 indicative of user behavior and/or a Web application 146 state. These patterns/behavior can be session and/or user specific. Thus, they will vary from one device 110-114 to another. Hence, at a time that the computing devices 110-114 send a request 160-164 (labeled A-C) to the Web server 140, the adjustor 130 can cause different responses 170-174 to be generated. This is true even when the requests 160-164 are identical to each other. Stated differently, even though the requests 160-164 from the client can be identical, the corresponding requests 166-168 conveyed from the adjustor 130 to the Web server 140 (which result in the responses 170-174) can be different from each other.

For example, the adjustor 130 can route the request 160 (from client—Request A) through to the Web server 140 without change or modification, so that the request 166 (from Adjustor—Request A) sent to the Web server 140 is the same as the request 160 sent from device 110. The request 162 (from client—Request B) from device 112 can correspond to a request 167 (from Adjustor—Request B) sent from adjustor 130, even though request 162 is different from request 167. The request 164 (from client—Request C) from device 114 can correspond to a request 168 (from Adjustor—Request C) sent from adjustor 130, even though request 164 is different from request 168.

Process 180 shows a stage-wise breakdown of one embodiment of the disclosure. Step 182 shows that a Web application (e.g., Web application 146) can be constructed that maps rules or RESTful style constraints to business functions (in one embodiment, the rules can be implemented by user experience adjustor 130, and the mappings can be recorded in data store 132). That is, the rules or RESTful constraints can standardize capturing browser (e.g., browser 120, 122, 124) events and can map these events to business events or business functions. Step 184 creates the rules and maps business functions to user behavior. For example, HTTP requests (events) can be mapped using HTTP request verbs. That is, GET, POST, or DELETE (RESTful request verbs) can be mapped to particular actions of the Web application (e.g., application 146).

Step 186 can map user behavior to Web application resource addresses. The Web application resource addresses can be unique uniform resource identifiers (URI's) in one embodiment. Each URI can correspond to a particular portion or function of the Web application 146. In other words, the RESTful style constraint can be a URI built with a structure that permits it to be parsed and mapped to business functions or events (e.g., www.example.com/Product/Component/Subcomponent/action). Additionally, other parameters in the request (e.g., request 160, 162, 164) can be parsed or extracted by following usage patterns. For example, URL parameters can be parsed from the requests to determine what stage a user is at in a Web application 146. Stage may have to be inferred using inference rules and patterns, as the Web application 146 itself may be implemented in a stateless fashion.

In step 188, once all the mappings have been established and the rules constructed, runtime user experience changes can be implemented. For example, user requests (160, 162, 164) can be rerouted (by adjustor 130) to Web application (146) addresses based on the user behavior. Use behavior can be determined from patterns detected by analyzing the RESTful requests (actions 150-154 and requests 160-164).

In system, a set of different computing devices 110, 112, 114 can be communicatively linked to a Web server 140 via a network. The user experience adjustor 130 can be implemented between the pathway of the computing device 110 and the Web server 140. In various embodiments, the adjustor 130 can be implemented as client-side software (of device 110, 112, 114), as server-side software (of Web server 140), as software executing within a network element (connected to a network connecting device 110, 112, 114 and server 140), or as a distributed functionality implemented within a combination of client 110, 112, 114, server 140, and/or a network element.

Each of the computing devices 110-114 and server 140 can include at least one processor, circuitry, storage medium, peripheral, network interface, and/or other components; all communicatively linked to each other via a bus. The processor of each device 110-114 and 140 can execute computer readable instructions. Devices 110-114 can include client-side software (Web browser 120-124) for interacting with the Web server 140. Server 140 can include an application server 142.

Each computing devices 110-114 can be a personal computer, a notebook computer, a netbook, a kiosk, a mobile phone, and the like. The Web server 140 can be a stand-alone computing device, a distributed set of computing devices, and/or a virtual server implemented using virtualization software.

Each Web browser 120, 122, 124, also referred to as an internet browser, can be a software application for retrieving, presenting, and traversing information resources on the Web. The information resources can be identified by a URI and can include a Web page, image, video, or other such content. The Web browser 120, 122, 124 can translate hypertext markup language (HTML) formatting for visual and/or audible presentation to a user. HTML formatting can be of a variety of more specific formats that conform to a standard generalized markup language (SGML) based language. Each Web browser 120, 122, 124 can support a variety of protocols for moving content over a network, such as File Transfer Protocol (FTP), Transmission Control Protocol (TCP) and the Internet Protocol (IP) (collectively referred to as TCP/IP), and the like. Examples of Web browser 120, 122, 124 include, but are not limited to, INTERNET EXPLORER, FIREFOX, OPERA, CHROME, SAFARI, and the like. In one embodiment, Web browsers 120, 122, 124 can include a rich internet interface (RII), a Web enabled gadget, and other types of application able to render a Web application 146.

The Web server 140 can be a hardware device that helps to deliver content over a network. Web server 140 can execute Web application server 142, which is a software program that is able to respond to requests 160-164 for content that conform to HTTP, Internet Message Access Protocol (IMAP), FTP, or other such standards. The Web application server 142 can deliver Web pages, each being a markup document conforming to an SGML based language, to clients (e.g., devices 110-114). In one embodiment, Web application server 142 can deliver images, style sheet, scripts (e.g., JAVASCRIPTS), the like as well as markup documents. In one embodiment, the Web application server 142 can support server-side scripting. Stated another way, the Web server 140 executing application server 142 can host a Web application 146, a Web site, or other set of remotely retrievable set of internet resources. Examples of Web application server 142 include, but are not limited to, APACHE WEB SERVER, Internet Information Services (IIS) server, CHEROKEE, ABYSS WEB SERVER, IBM HTTP SERVER (IHS), and the like.

The Web application 146 can use a set of web documents 147 written in a standard format supported by Web browsers 120, 122, 124. In one embodiment, each individual page or document 147 of the Web application 146 can be delivered to the requesting client (device 110-114) as a static document, but the sequence of pages 147 can provide an interactive experience. The Web application 146 can include static and dynamic elements in one embodiment. For example, JAVA, JAVASCRIPT, dynamic hypertext markup language (DHTML), FLASH, SILVERLIGHT, and other technologies (together indicated as non-static elements 148) can be utilized.

A network connecting device 110-114, server 140 and user experience adjustor 130 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network can include local components and data pathways necessary for communications to be exchanged among computing device components and between integrated device components and peripheral devices. The network can also include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network can include line based and/or wireless communication pathways.

Each device 110-114 and server 140 can include a data store, such as data store 132 and 144, which is physically implemented within any type of hardware including, but not limited to, a magnetic disk, an optical disk, a semiconductor memory, a digitally encoded plastic memory, a holographic memory, or any other recording medium. The data stores can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

In one embodiment, the user experience adjustor 130 can be a standards based rules engine that allows a non-technical person to use a user interface to define a set of business events or patterns of business events to observe over a designated time frame. Adjustor 130 can allow the non-technical person to tailor some action taken by a Web application server responsive to a request based on the observed set of events and/or patterns. The action taken by the adjustor 130 can produce a change to the user experience by modifying the request. That is, the request sent by the adjustor 130 to a Web server 140 can be one that is never explicitly sent by a client device 110, 112, 114. Stated differently, the adjustor 130 can map a business event back to a HTTP request using similar constraints to those enforced in a design of each HTTP request to facilitate mapping to business events.

To illustrate adjustor 130 in operation, the following use case is provided. The context for the use case is a health care insurance vendor Website (e.g., the Web application). Assume a customer of the Web site is interested in purchasing health insurance. This user pursues the Web site in a normal fashion, tries out a few quotes, but fails to quickly find quotes for the exact features he/she is interested in. In a normal course of events, this user would leave the Web site for another, and ultimately not make a purchase through the Web site.

In a system that includes the user experience adjustor 130, however, a usage pattern can be discerned from the behavior of the user with the Web site. Specifically, the user experience adjustor 130 can analyze which portions (pages) of the Web site the user spent the most time viewing, which types of products the user was looking at, and other such clues. Based on these clues and determined patterns, the user's experience with the health care Web site can be personalized and dynamically adjusted (i.e., HTTP requests can be submitted by the adjustor 130 and/or user issued HTTP request can be modified by the adjustor 130) to direct and corral the user to the best product offering for the user. These adjustments can lead to more sale closures and to increased effectiveness of the Web site.

To continue with the use case. Assume the following rule is included in data store 132 for use by the adjustor 130:

IF the user is spending time in our health plans documents section AND
IF the user is using the search health plans gadget OR
IF the user has entered some personal details This rule can be considered the "pattern" that the adjustor 130 detects from the actions 150, 152, 154. It should be appreciated that the above rule is written in a non-technical manner, which a health care analyst can establish. In one contemplated embodiment, the adjustor 130 can accept "natural language" rules, such as the one above and use them to build a deterministic (or heuristic) pattern discernable from the actions 150, 152, 154. Any number of pattern matching techniques and technologies can be utilized to this effect. In a different embodiment of the disclosure, the rules used by the adjustor 130 may have to be more defined, such as:

IF ("a user spends at least 15 minutes viewing any Web site in the set of (Page 1, Page 3, Page 4, Page 6) AND
IF (last user request for URI XXXXX) (equates to search health plan gadget) OR
IF (at least four of: user name, location, occupation, family status, address, phone number, age) KNOWN Graphical user interfaces, selection mechanism, rules based programming languages, and the like can be used in various embodiments to specify the rules used by adjustor 130.

The above patterns can be matched to business rules and/or specific Web application resources. For example, the rule above could be mapped to any of the below resources:

Resource A:
"We see that you are interested in xyz. Based on your personal information that you provided, may we suggest you look at XXX (link) or YYY (link)?:
Resource B:
"We see you are interested in xyz. Can we call you and help explain these plans to you? (Yes/No)
Resource C:
"You seem to have difficulty completing this form—here are some links (link A) (link B) (link C) to tutorials."

As noted above, multiple possibilities exist. Each of these can be associated with an addressable resource (e.g., a URI) or a callable option (i.e., trigger popup providing an option to contact a human agent or have a human agent contact you). In one embodiment, the selected one of the options (e.g., Resource A, B, or C) can depend on a system determinable condition. For example, an option to speak with a human agent may only be presented when an agent is available. An option for a special may only be presented if other configurable criteria are met.

It should be appreciated that the above use case is a simple example provided to demonstrate capabilities of the adjustor 130. The disclosure and its capabilities are not to be limited by any specifics contained in the use case example.

Figure 2:
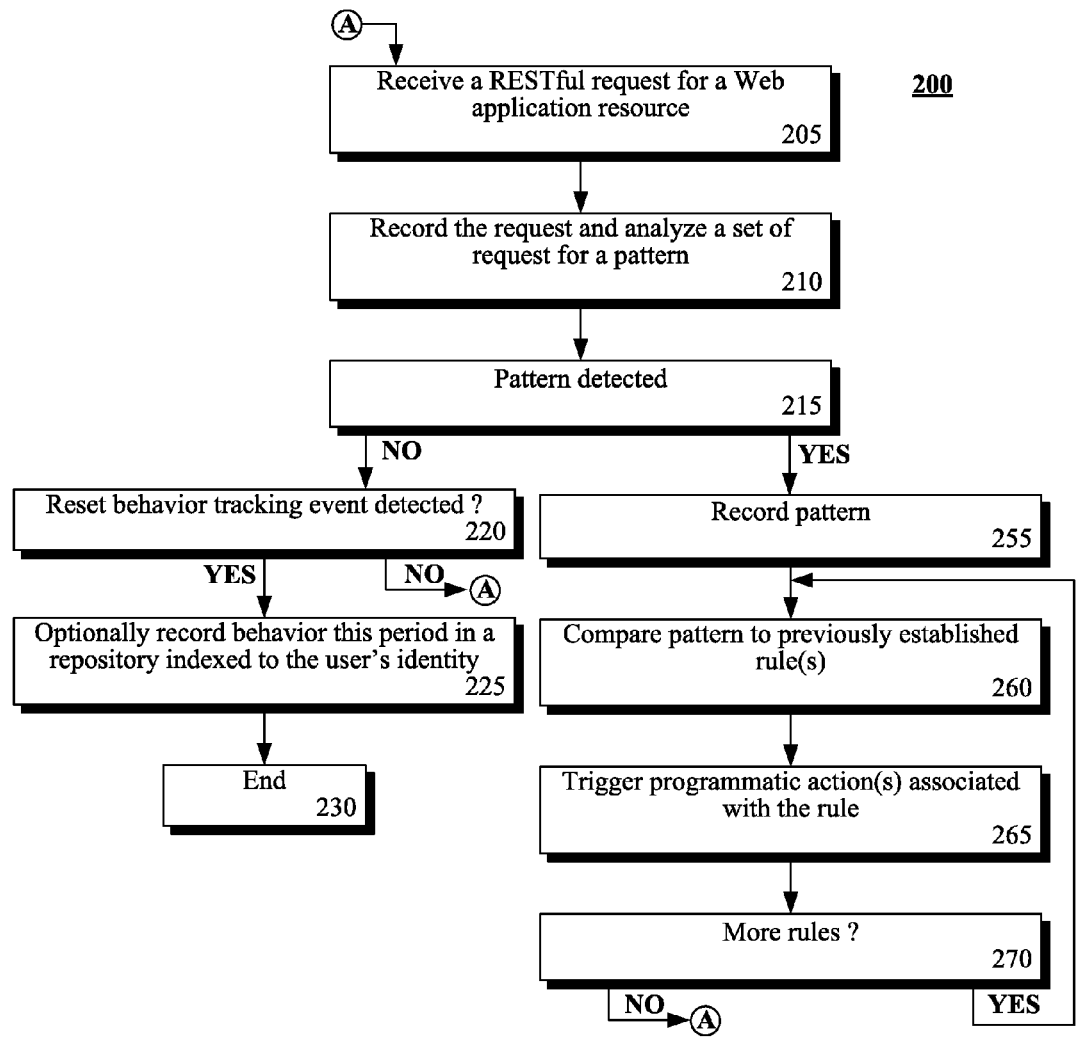
FIG. 2 shows a flow chart of a method for adjusting a user experience for a Web application based on user behavior in accordance with an embodiment of the disclosure.

FIG. 2 shows a flow chart of a method 200 for adjusting a user experience for a Web application based on user behavior in accordance with an embodiment of the disclosure. In one embodiment, the method 200 can be performed in context of the system of FIG. 1.

Method 200 can begin in step 205, where a RESTful request can be received for a Web application resource. In one embodiment, the RESTful request can be a HTTP request and the Web application resource can be a uniquely identified resource (e.g., a URI, a unique domain name, etc.). In step 210, the request can be stored and analyzed in relationship/conjunction with a set of other recorded requests to determine a pattern. The pattern can be based be used to determine a user interest that corresponds to a business objective or function. For example, a user's focus (as determined by analyzing a set of RESTful requests) on a specific set of Web pages for a pre-designated durations can indicate an interest or a lack of interest in a specific offering of a Web application.

In step 215, a pattern can be detected, which can involve matching a pattern determined from the requests against one of a set of previously defined patterns. If no pattern is detected from the analysis, the method can progress from step 215 to step 220. In step 220, a behavior tracking event can be detected, where the event relates to whether or not to perform a reset. For example, one reset event can be to automatically stop recording RESTful requests to determine patterns on a per-session basis. Another example of a reset event is when a user opts to leave a Web application (i.e., when patterns are to be based on a per-Web Application usage basis). Another reset event can be based on a particular period of inactivity (i.e., reset event occurs whenever a user provides no new requests for at least an hour). If a reset event is not detected, the method can loop to step 205, where additional RESTful requests can be received and processed.

If a reset event is detected, behavior for the period can be optionally recorded in a repository and indexed to the user's identity, as shown by step 225. This information can be used to develop a user profile, which is used to determine behavior, preferences in general, and the like. Step 230 can end the process after step 225 is performed.

A detected pattern can be recorded in step 255. The recorded pattern can be compared to a set of previously established rules, as indicated by step 260. The rules of step 260 can be dependent upon a single pattern, upon an occurrence of multiple patterns, or upon the occurrence of one or more patterns and a set of additional programmatically determined conditions. Each time a rule is satisfied, a set of one or more programmatic actions can be triggered in response as shown by step 265. If there are more rules to be compared in step 270, the method can progress from step 270 to step 260, where the comparison and selective triggering process continues. When there are no more rules to be compared to the pattern, the method can progress to step 205, where additional RESTful requests can be received.

Figure 3:
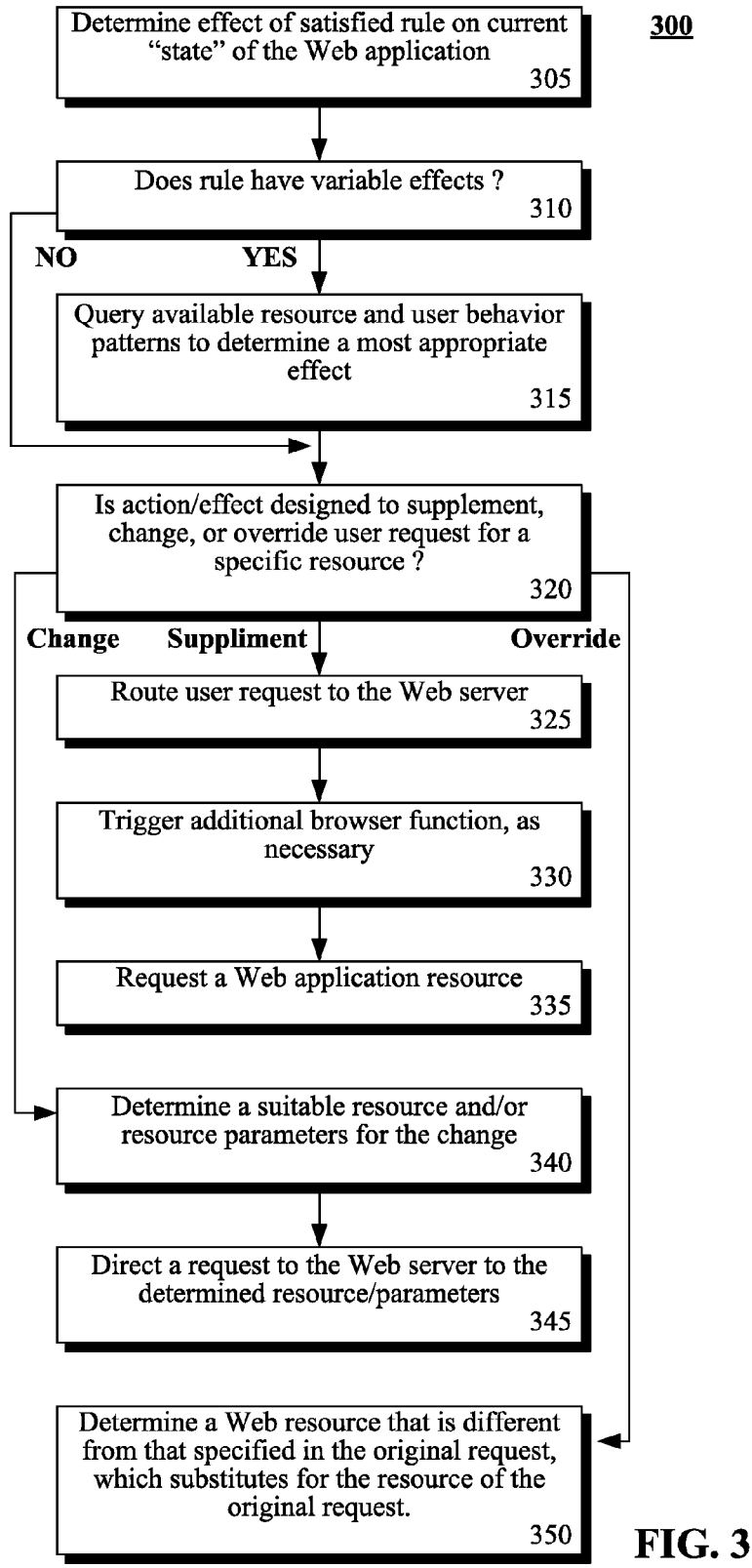
FIG. 3 shows a flow chart of a method for triggering actions responsive to a rule being satisfied in accordance with an embodiment of the disclosure.

FIG. 3 shows a flow chart of a method 300 where actions can be taken responsive to a rule being satisfied in accordance with an embodiment of the disclosure. That is, method 300 can represent one embodiment of a set of actions that occur in step 365 of method 300.

Method 300 can begin in step 305, where an effect of a satisfied rule can be determined given the current "state" of the Web application. It should be emphasized the current state can be determined from analyzing patterns resulting from stateless or RESTful commands, such as HTTP commands conveyed from a user to a Web server. In one embodiment, values input in fields of the Web application by a user can also be analyzed and used to determine the "state" of the Web application. This is true even though the Web application itself may or may not persist this information. For example, in one embodiment, the "state" of the Web application can be determined by a network element distinct from the Web server, which intercepts Web server requests from a client.

Satisfaction of a rule may or may not produce variable effects, as expressed by step 310. A variable effect can represent an effect that varies based on additional factors, such as past or present user behavior, user preferences determined from a maintained user profile, computing resources available to handle user (or customer) interactions, and the like. When variable effects are possible, variable factors relevant for the effect can be determined. For example, available resources and user behavior patterns can be queried to determine a most appropriate effect for a given situation, as shown by step 315. To illustrate, the rule with a variable effect can indicate that a likelihood of X percentage exists that a user is seriously interested in purchasing a service from a Web application. Should a customer service representative be available (e.g., a business resource) for a teleconference call or an online chat, an interaction option to converse directly with the customer server representative can be presented via a Web application user interface. Should a representative not be available (e.g., have an availability of at least Y percent or be available within a wait of Z seconds or less), then a different effect, such as automatically directing a user to Web application portion for the service, can be presented within the user interface.

In step 320, a determination can be made as to whether the action or effect is designed to supplement, change, or override a user's request.

A supplement indicates that the user requested action is submitted unchanged to the Web application, but that an additional request for another resource (one not explicitly specified by a user) is submitted to the Web application. For example, a user can request (e.g., HTTP request) information for a Family Insurance segment of a Web site. A user experience adjustor can determine that the user is serious about a family policy based on a set of analyzed requests previously made by that user. The user experience adjustor can determine (via a pre-configured rule) that is it appropriate to prompt the user to speak directly with a customer service representative. At the same time, the original user request (for the Family Insurance segment of the Web site), is still appropriate. Thus, the original request can be forwarded or routed to the Web server in an unmodified form. At the same time, a separate HTTP request (causing a pop-up prompting the user of an option to speak directly with a customer service agent) can be conveyed to the Web server.

In a different example, a special officer (again via a popup) can be presented to the user, where the popup is a server response to an adjustor issued request. The original request (for the Family Insurance segment) can still be issued to the Web server, in an unmodified form. In both of the above examples, the original request is sent unmodified to the Web server, yet an additional request is also sent to the Web server.

Stated differently, a RESTful request can be routed to the Web server, as shown by step 325. In step 330, an additional Web browser function can be optionally triggered as necessary. For example, a new pop-up window can be triggered for a client-side Web browser, where the supplemental content is to be presented in the pop-up window. In another embodiment, the browser's size can be automatically expanded and a new frame, region, section, and the like can be presented to the user, where the supplemental content is provided in that new frame, region, section, portlet, etc. having its own address (thus having a unique HTTP request associated). The supplemental request can be sent in step 335.

A change can represent a situation where a rule causes a user issued RESTful request to be changed or modified, which is indicated by the method proceeding from step 320 to step 340. In step 340, an original RESTful request can be modified to add an additional parameter, URL sub-section, to modify a property of a CSS style-sheet, to modify a parameter of dynamic Web application code, and the like. The request as modified can be submitted to the Web server.

In one embodiment, the rule can cause an original request to be overridden, as shown by the method proceeding from step 320 to step 350. In step 350, a Web resource that is different from the one that was specified in the original request can be determined. A request for the different Web resource, which can be identified by a resource specific URI or other identifier can be issued to the Web server.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    receiving a set of three or more RESTful requests from a client computing device, wherein a third request of the RESTful requests are received after a first two of the RESTful requests have been fulfilled, wherein at least the third request includes a resource identifier for a Web server running a Web application, wherein the RESTful requests include RESTful commands that are stateless, wherein the Web application itself does not persist state information and is implemented in a stateless fashion;
    determining at least one user behavior pattern from analyzing the first two RESTful requests;
    in responding to the third request, comparing the user behavior pattern against a plurality of previously established patterns mapped to Web application functions, wherein said plurality of previously established patterns are each indexed against a resource identifier for the Web server which is mapped to a corresponding function of the Web application;
    in response to the comparing, matching the user behavior pattern to a corresponding previously established pattern; and
    in response to the third request and in response to the matching, conveying a pattern RESTful request to the Web server for a Web resource identified by the matched resource identifier, wherein said matched resource identifier is the resource identifier that is indexed against the previously established pattern and that is mapped to the corresponding function of the Web application, wherein the pattern RESTful request causes the Web server to serve the Web resource identified by the matched resource identifier to the client computing device such that the Web application in responding to the third request has been dynamically adjusted for user behavior as determined from the user behavior pattern from analyzing the first two RESTful requests, wherein the pattern RESTful request was not directly issued by a user of the client computing device, and wherein the matched resource identifier is for a resource not explicitly requested by the user of the client computing device, wherein the adjustments by the Web application for the user behavior are not dependent on code logic of the Web application itself.

2. The method of claim 1, wherein the Web resource served by the Web server responsive to receipt of the pattern RESTful request causes a change to layout elements of a user interface that is displayed in a Web browser of the client computing device.

3. The method of claim 1, wherein the determined at least one user behavior pattern indicates a user interest that is inferred from the set of RESTful requests and timing between the set of RESTful requests, wherein the pattern RESTful request is a request to the Web server for additional information specific to the user interest.

4. The method of claim 1, wherein the pattern RESTful request is a modification of the third request from the client computing device, which is provided to the Web server instead of providing the RESTful request from the client computing device.

5. The method of claim 1, wherein the receiving, determining, comparing, matching, and conveying are performed by a network element, which executes within a network to which the client computing device and the Web server are communicatively linked, wherein the network element receives the set of RESTful requests from the client computing device and selectively routes the RESTful requests of the set to the Web server.

6. The method of claim 1, wherein the receiving, determining, comparing, matching, and conveying are performed by a request pre-processing software component executing on the Web server.

7. The method of claim 1, wherein the receiving, determining, comparing, matching, and conveying are performed by a client-side program executing on the client-computing device.

8. The method of claim 1, wherein each of the RESTful requests is a HTTP request.

9. The method of claim 1, further comprising:
    routing each of the received set of one or more RESTful requests from the client computing device to the Web server, wherein each of the RESTful requests is a request for Web application content from the Web application, which is hosted by the Web server.

10. The method of claim 1, wherein the user behavior pattern is indicative of user interest in a business offering available via the Web application that is hosted by the Web server, wherein the resource corresponding to the matched resource identifier comprises content related specifically to the user interest, wherein the Web resource served by the Web server in response to the pattern RESTful request causes a user interface of a Web browser of the client computing device to display the content that is related to the user interest.

11. The method of claim 1, wherein each of the RESTful requests is for a Web page of the Web application, which is hosted on the Web server.

12. The method of claim 11, wherein the user behavior pattern is indicative of a user's interest in a business offering available through the Web application, wherein the matched resource identifier is an identifier for the business offering.

13. A computer program product comprising a non-transitory computer readable storage medium having computer usable program code embodied therewith, the computer usable program code comprising:
  computer usable program code stored on a non-transitory storage medium that upon being executed by a processor is operable to receive a set of three or more RESTful requests from a client computing device, wherein a third request of the RESTful requests are received after a first two of the RESTful requests have been fulfilled, wherein at least the third request includes a resource identifier for a Web server running a Web application, wherein the RESTful requests include RESTful commands that are stateless, wherein the Web application itself does not persist state information and is implemented in a stateless fashion;
  computer usable program code stored on a non-transitory storage medium that upon being executed by a processor is operable to determine at least one user behavior pattern from analyzing the first two RESTful requests;
  computer usable program code stored on a non-transitory storage medium that upon being executed by a processor is operable to, in response to the third request, compare the user behavior pattern against a plurality of previously established patterns mapped to Web application functions, wherein said plurality of previously established patterns are each indexed against a resource identifier for the Web server which is mapped to a corresponding function of the Web application;
  computer usable program code stored on a non-transitory storage medium that upon being executed by a processor is operable to, in response to the comparing, match the pattern to a corresponding previously established pattern; and
  computer usable program code stored on a non-transitory storage medium that upon being executed by a processor is operable to, in response to the third request and in response to the matching, convey a pattern RESTful request to the Web server for a Web resource identified by the matched resource identifier, wherein said matched resource identifier is the resource identifier that is indexed against the previously established pattern and that is mapped to the corresponding function of the Web application, wherein the pattern RESTful request causes the Web server to serve the Web resource identified by the matched resource identifier to the client computing device such that the Web application in responding to the third request has been dynamically adjusted for user behavior as determined from the user behavior pattern from analyzing the first two RESTful requests, wherein the pattern RESTful request was not directly issued by a user of the client computing device, and wherein the matched resource identifier is for a resource not explicitly requested by the user of the client computing device, wherein the adjustments by the Web application for the user behavior are not dependent on code logic of the Web application itself.

14. The computer program product of claim 13, wherein the determined at least one user behavior pattern indicates a user interest that is inferred from the set of RESTful requests and timing between the set of RESTful requests, wherein the user behavior pattern RESTful request is a request to receive additional information specific to the user interest from the Web server, wherein said set of RESTful requests comprise a plurality of RESTful requests, wherein each of the RESTful requests is for a Web page of a Web application hosted on the Web server.

15. The computer program product of claim 13, wherein the receiving, determining, comparing, matching, and conveying are performed by a network element, which executes within a network to which the client computing device and the Web server are communicatively linked, wherein the network element receives the set of RESTful requests from the client computing device and selectively routes the RESTful requests of the set to the Web server.

16. A method comprising:
  routing a plurality of HTTP requests for Web application content from a client computing device to a Web server, wherein a third request of the HTTP requests is received after a first two of the HTTP requests have been fulfilled, wherein the HTTP requests include commands that are stateless, wherein the Web application itself does not persist state information and is implemented in a stateless fashion, wherein the third request is directed to the Web server upon which the Web application runs;
  analyzing the first two requests for user behavior patterns indicative of user interest in a business offering available via the Web application; and
  in response to the third request and in response to results of the analyzing, conveying an unrequested HTTP request different from the third request to the Web server for Web application content that was not explicitly requested from the client computing device, where per the unrequested HTTP request, the Web server is to convey a response that provides content from the Web application related specifically to the user interest, which causes a user interface of a Web browser of the client computing device to display the content that is related to the user interest, wherein the unrequested HTTP request represents a modification of the third request adjusted for user interest determined by analyzing the first two requests, wherein content related to the user interest content is displayed to the user by the Web application which has made a dynamic adjustment of content provided, wherein the dynamic adjustment is not dependent on code logic of the Web application itself but results from execution of statelessly implemented Web application functions triggered by the unrequested HTTP request.

17. The method of claim 16, further comprising:
  at the end of each application session involving the Web application, storing user interest information gleaned from the HTTP requests in a user specific profile; and consulting the user specific profile for each session between a user and the Web application to improve an ability to determine the user interest and to responsively modify HTTP requests to the Web server in accordance with this determined user interest.

18. The method of claim 16, further comprising:
organizing the Web application so that a plurality of different business functions are associated with different resource identifiers; and
parsing the HTTP requests to determine business functions of interest to a user of the client computing device during the analyzing of the routed HTTP requests.

19. The method of claim 16, further comprising:
modifying at least one parameter of a HTTP request from the client computing device based on the user interest; and
routing the modified HTTP request to the Web server.

20. The method of claim 16, wherein the analyzing of the routed HTTP requests further comprises:
determining at least one user behavior pattern from analyzing the routed HTTP requests;
comparing the at least one user behavior pattern against a plurality of previously established patterns, wherein said plurality of previously established patterns are each indexed against a resource identifier of for the Web server; and
in response to the comparing, matching the at least one pattern to a corresponding previously established pattern, wherein the unrequested HTTP request is for a Web resource identified by a matched resource identifier, wherein the matched resource identifier is the resource identifier that is indexed against the at least one previously established pattern that was matched.

* * * * *